United States Patent
Sripathi et al.

(10) Patent No.: US 7,492,882 B1
(45) Date of Patent: Feb. 17, 2009

(54) C2P PROVISIONING LATE-BREAKING SCENARIOS

(75) Inventors: Raj R. Sripathi, Overland Park, KS (US); Angela R. Winner, Olathe, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 1121 days.

(21) Appl. No.: 10/790,411

(22) Filed: Mar. 1, 2004

(51) Int. Cl.
*H04M 3/42* (2006.01)

(52) U.S. Cl. .............................. 379/201.01; 379/207.02; 379/219; 379/220.01; 370/217; 370/230; 370/252; 370/254; 370/347; 370/352; 370/356; 370/465; 370/468; 709/209; 709/226; 709/227; 709/231; 709/242

(58) Field of Classification Search ............ 379/201.01, 379/7.02, 219, 220.01, 207.02; 370/217, 370/230, 252, 254, 347, 352–356, 465, 468; 709/209, 226, 227, 231, 242

See application file for complete search history.

(56) References Cited

U.S. PATENT DOCUMENTS

| | | | | |
|---|---|---|---|---|
| 3,923,504 A | * | 12/1975 | Bean | 430/41 |
| 6,735,293 B2 | * | 5/2004 | Doherty et al. | 379/201.12 |
| 7,158,508 B2 | * | 1/2007 | Abrams et al. | 370/352 |

OTHER PUBLICATIONS

Angela Winner, et al., *System and Method for Access Provisioning in Multiple Telecommunications Technologies*, Filing Date—May 5, 2003, U.S Appl. No. 10/429,614, Specification (39 pgs.) and Drawings (10 sheets).

* cited by examiner

*Primary Examiner*—Quynh H Nguyen
(74) *Attorney, Agent, or Firm*—Sonnenschein Nath & Rosenthal LLP

(57) ABSTRACT

A system for managing circuit-to-packet provisioning late breaking scenarios. The system comprises an order entry system operable to receive orders for services, each order having a network type related to the order; a migrated system operable to manage provisioning services for orders received by the order entry system for services on packet-based networks; a non-migrated system operable to manage provisioning services for orders received by the order entry system for services on circuit-based networks; and an order control manager operable to reallocate orders between the migrated and non-migrated systems when the network type changes after allocating the order.

10 Claims, 1 Drawing Sheet

C2P PROVISIONING LATE-BREAKING SCENARIOS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the provisioning of telecommunications equipment. More particularly, embodiments of the present invention manage the reallocation of provisioning requests that have been allocated to an incorrect provisioning system.

BACKGROUND OF THE INVENTION

Telecommunications Service Providers (TSPs) are discovering that new technologies may offer opportunities for better service at lower cost. As part of their core business, TSPs provide electronic communication paths between customers. In their original form, these paths were dedicated telegraph wires between customers. After a short time, switching centers were invented and these paths took the form of wires between the customers and the local switching centers. The operators at the local switching centers were able to manually relay messages from one wire to another and were also able to electrically connect any of the wires so that local customers could communicate directly.

With the advent of the telephone, the single wires were replaced with closed circuit "loops" between the customers and the switching centers and the customer base began increasing rapidly. Before long, the local switching centers were connected via multiconductor "trunk lines" and long distance communications became possible between customers of different switching centers. Initially, for both local and long distance, the connecting of different circuits was performed manually by operators. As electronics technology improved, the connecting was done using arrays of electronic relays that switched in response to electric pulses sent by a customer's phone as the customer dialed. Until this time, all communication paths were established using what is now known as "circuit switching". In other words, a communication path (i.e., a closed electrical circuit between the customers) was established that remained fixed until the communication ended.

With the evolution of transistors, the TSPs developed ways to transport multiple conversations on the same circuit. One method involved frequency division multiplexing (FDM), in which analog processing was done on each end of a trunk line to shift a communication from the normal frequency band ("baseband") to one of several higher frequency slots for transport across the trunk line and to shift the communication back to baseband at the other end. As technology continued to evolve, TSPs began performing analog-to-digital conversion to send the communication across the trunk lines digitally. Digital communication allowed for the use of FDM but also allowed for the use of time division multiplexing (TDM) in which different communications are intermixed in time in a predetermined way and reconstructed at the other end.

The analog and digital processing for FDM and TDM typically replaced a physical circuit as a communication path with allocated slots in frequency and time on a given conductor. In operation, these slots are for most purposes equivalent to physical circuits and hence they may be referred to as "virtual circuits". The term "circuit switching" still applies because the communication path remains fixed until the communication ends. Some TSPs are replacing or augmenting trunk lines with trunks of optical fibers. Digital TDM technology has been applied to these optical trunks as well.

The recent growth in data communications presents a challenge to the communications capacity of TSP networks that were primarily designed to carry telephone conversations. To minimize unused bandwidth (e.g., unused frequency and time domain slots), another technology has been developed. Referred to as asynchronous transfer mode (ATM), this technology has been developed as an industry standard that facilitates the transport of mixed communication types such as voice, video, and data. It relies on computerized switches to perform "packet switching". Unlike circuit switching, packet switching allows for the use of different circuits during the communication and may even allow for out-of-order delivery of portions of the communication. A customer communication is digitized, converted into data packets, and routed towards the destination via any available bandwidth. At the other end, the packets are sorted and reassembled to reconstruct the customer communication.

TSPs wishing to switch from one technology to another are invariably faced with a changeover period in which both old and new technologies co-exist. In the case of the changeover to ATM, a TSP's network is likely to have trunks using the older TDM technology contemporaneously with trunks using the newer ATM technology. Systems designed for managing the older technology may not be suitable for managing the newer technology and, conversely, adding short-term functionality to newer systems may be inefficient in view of already existing systems for managing the older technology.

When a transition from one technology to another is in progress, equipment using the newer packet-based technologies such as ATM can be referred to as migrated technologies. Equipment still using the older circuit-based technologies such as FDM and TDM can be referred to as non-migrated technologies.

SUMMARY OF THE INVENTION

An embodiment of the invention is a system for managing circuit-to-packet provisioning late breaking scenarios. The system comprises an order entry system operable to receive orders for services, each order having a network type related to the order; a migrated system operable to manage provisioning services for orders received by the order entry system for services on packet-based networks; a non-migrated system operable to manage provisioning services for orders received by the order entry system for services on circuit-based networks; and an order control manager operable to reallocate orders between the migrated and non-migrated systems when the network type changes after allocating the order.

An alternative embodiment is a method for managing circuit-to-packet provisioning late breaking scenarios. The method comprises receiving an order for services to provision; determining a network type identifying a network to provision the services; associating the network type with the order; allocating the at least some of the order to a first system based on the network type associated with the order, the first system operable to manage provisioning the services on the network; determining that the network is different; changing the network type; and reallocating the at least some of the order to a second system based on the change to the network type associated with the order, the second system operable to manage provisioning services on the network.

Another alternative embodiment is a system for managing circuit-to-packet provisioning late breaking scenarios. The system comprises an order entry system operable to receive orders for provisioning services on a network, a queue operable to receive a message including a late breaking scenarios of the orders, and an order control manager operable in response to receiving the message from the queue including late breaking scenarios to reallocate orders between a migrated services provisioning management system and a non-migrated services provisioning management system when the network is different than initially allocated to the order.

DETAILED DESCRIPTION OF THE PREFERRED EMBODIMENTS

Figure 1:
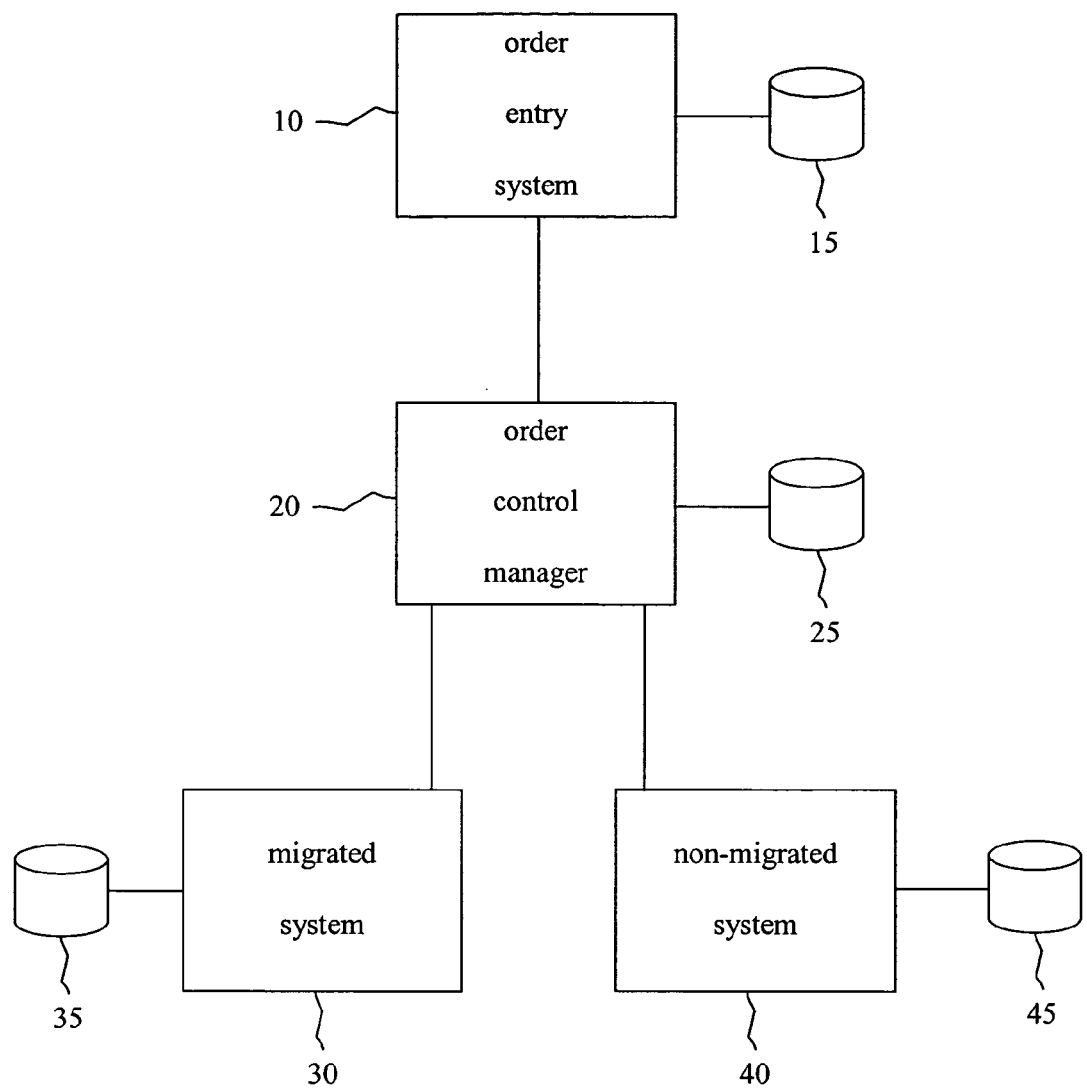
FIG. 1 is a block diagram of a system for provisioning telecommunications equipment.

A TSP typically provides an infrastructure that supports communications between customers. The infrastructure may include a network of wires, cables, optical fibers, wireless links, and/or satellite links. The network is controlled by a hierarchy of switching centers. The TSP that provides the network connection and equipment may own all or some portion of the network through which communication paths are provided. Alternatively, because building networks is a capital-intensive proposition, the TSP may not be an owner but rather may lease access to the network from the network owner.

When a customer requests access to the network equipment owned or leased by a TSP, the request can take the form of an access service request or ASR. An ASR is a telecommunications industry standard form used to establish, add, change, or disconnect trunks, circuits, and/or facilities. An ASR may specify circuit information such as a starting point, an ending point, and a desired amount of bandwidth between the two points. One ASR may optionally cover multiple circuits; e.g., it may specify multiple pairs of starting and ending points. When a network owner or a TSP leasing network equipment receives an ASR, it allocates resources to satisfy (or "provision") the request. Namely, the TSP or network owner allocates channels on one or more trunk lines and allocates hardware in the switching centers to couple the trunk line channels in a sequence that connects the two points in each pair.

FIG. 1 illustrates a system for processing ASRs and provisioning the network equipment requested by the ASRs. In this embodiment, a migration is in progress from a circuit-based technology such as FDM or TDM to a packet-based technology such as ATM. Thus, two provisioning systems are in operation concurrently. One is a provisioning system for packet-based, or migrated, technologies and the other is a provisioning system for circuit-based, or non-migrated, technologies. In FIG. 1, the provisioning system for migrated technologies is referred to as the migrated system 30 and the provisioning system for non-migrated technologies is referred to as the non-migrated system 40. A migration from circuit-based technology to packet-based technology can be referred to as C2P conversion.

An order entry system 10 may facilitate creation and acceptance of ASRs and may forward the ASRs to an order control manager 20. Order control manager 20 may process an ASR to determine whether the ASR relates to the migrated system 30, the non-migrated system 40, or both. Order control manager 20 may then allocate the provisioning operations to the migrated system 30 and/or the non-migrated system 40 accordingly. Order control manager 20 may further track the status of the provisioning operations and serve as an intermediary between the order entry system 10 and the provisioning systems 30 and 40. In this way, the order control manager 20 can manage the workflow from order entry to order completion.

Field engineers typically receive ASRs from the migrated system 30, the non-migrated system 40, or both and then perform the work specified by the ASRs. In performing this work, an engineer may discover that the initial allocation of ASRs to the provisioning systems 30 or 40 was incorrect. Situations where the original allocation of an ASR to a provisioning system 30 or 40 is found to be incorrect and where a reallocation should occur can be referred to as late-breaking scenarios. Three types of late-breaking scenarios can be defined.

In one late-breaking scenario, an ASR originally allocated completely to one provisioning system 30 or 40 should actually be allocated completely to the other provisioning system 30 or 40. For example, an ASR might specify that it deals only with migrated equipment and therefore should be handled by the migrated system 30. Upon attempting to perform the provisioning specified by the ASR, a field engineer might discover that the ASR actually deals only with non-migrated equipment and should be handled only by the non-migrated system 40. Alternatively, an ASR might specify that it should be handled only by the non-migrated system 40 but a field engineer might discover that the ASR should be handled only by the migrated system 30.

In another late-breaking scenario, an ASR originally allocated to only one provisioning system 30 or 40 should actually be allocated to both provisioning systems 30 and 40. An ASR that needs to be handled by both provisioning systems 30 and 40 can be referred to as a dual order. As an example, an ASR might specify that it deals only with migrated equipment and therefore should be handled by the migrated system 30. Upon attempting to perform the provisioning specified by the ASR, a field engineer might discover that the ASR is actually a dual order that deals with both migrated and non-migrated equipment. In this case, portions of the ASR should be handled by the migrated system 30 and other portions should be handled by the non-migrated system 40.

Alternatively, an ASR might specify that it should be handled only by the non-migrated system 40 but a field engineer might discover that portions of the ASR should be handled by the migrated system 30 and other portions should be handled by the non-migrated system 40. For instance, an engineer on the non-migrated system 40 may discover that, while the initial and terminal segments of a circuit can be provisioned with circuit-based technologies, one or more intermediate segments may need to be provisioned using packet-based technologies.

In the third type of late-breaking scenario, an ASR originally allocated to both provisioning systems 30 and 40 should actually be allocated to just one provisioning system 30 or 40. For example, an ASR might specify that it is a dual order that should be handled by both the migrated system 30 and the non-migrated system 40. A field engineer might discover that the ASR should actually be handled exclusively by the migrated system 30 or exclusively by the non-migrated system 40.

Each of the three late-breaking scenarios can be managed by a different error-handling procedure. In the case where an ASR has been allocated completely to one provisioning system 30 or 40 but should be allocated completely to the other provisioning system 30 or 40, an error-handling procedure known as a circuit move can be implemented. In a circuit move, an entire ASR is transferred from one provisioning system 30 or 40 to the other via the order control manager 20. That is, an ASR that has been allocated to the migrated system 30 but should be allocated to the non-migrated system 40 is sent from the migrated system 30 to the order control manager 20 and then from the order control manager 20 to the non-migrated system 40. Similarly, an ASR that has been allocated to the non-migrated system 40 but should be allocated to migrated system 30 is sent from the non-migrated system 40 to the order control manager 20 and then from the order control manager 20 to the migrated system 30.

In the case of a dual order that is split between both provisioning systems 30 and 40 but that should be allocated exclusively to only one of the provisioning systems 30 or 40, an error-handling procedure known as a dual circuit override can be implemented. In a dual circuit override, the portion of an ASR that was allocated to the incorrect provisioning system 30 or 40 is sent from that provisioning system 30 or 40, via the order control manager 20, to the other provisioning system 30 or 40. For example, an ASR might be allocated to both the migrated system 30 and the non-migrated system 40 when it actually should be allocated only to the non-migrated system 40. In this case, the portion of the ASR that was sent to the migrated system 30 is sent from the migrated system 30 to the order control manager 20 and from the order control manager 20 to the non-migrated system 40.

In the case where an ASR has been allocated completely to one provisioning system 30 or 40 but the ASR is actually a dual order that should be allocated to both provisioning systems 30 and 40, an error handling procedure known as a late breaking dual can be employed.

In a late breaking dual, the portions of an ASR that pertain to the provisioning system 30 or 40 to which the ASR was sent remain on that provisioning system 30 or 40. The portions of the ASR that pertain to the other provisioning system 30 or 40 are sent, via the order control manager 20, to the other provisioning system 30 or 40. For example, if an entire ASR is allocated to the migrated system 30 but portions of the ASR should be allocated to the non-migrated system 40, the portions that belong on the migrated system 30 stay on the migrated system 30. The portions that belong on the non-migrated system 40 are sent to the order control manager 20 which then sends them to the non-migrated system 40.

When a provisioning system 30 or 40 receives an ASR, the provisioning system 30 or 40 determines whether it can handle the entire ASR or whether some or all of the ASR should go to the other provisioning system 30 or 40. If some or all of the ASR should go to the other provisioning system 30 or 40, the provisioning system 30 or 40 that originally received the order informs the order control manager 20 that it is not capable of working on some or all of the ASR. If a provisioning system 30 or 40 determines that it cannot process any portion of the ASR, the provisioning system 30 or 40 sends the entire ASR back to the order control manager 20. If a provisioning system 30 or 40 determines that it can process only a portion of the ASR, the provisioning system 30 or 40 retains the portion of the ASR that it is capable of processing and returns the remaining portion to the order control manager 20. In either case, the order control manager 20 then converts the returned data to the format of the other provisioning system 30 or 40 (in a process described below) and sends the returned data to the other the provisioning system 30 or 40.

As an example, an ASR may be labeled as pertaining strictly to packet-based technologies and thus may be allocated only to the migrated system 30. However, the ASR might actually pertain to both packet-based and circuit-based technologies. In this case, the migrated system 30 would retain the packet-based portion of the ASR and return the circuit-based portion to the order control manager 20. After data format conversion, the order control manager 20 sends the circuit-based portion to the non-migrated system 40. The non-migrated system 40 can either accept or reject the circuit-based portion. If the non-migrated system 40 accepts the circuit-based portion, the non-migrated system 40 sends a confirmation to the order control manager 20. When the order control manager 20 receives the confirmation, it notifies the migrated system 30 that the non-migrated system 40 has accepted the circuit-based portion and that the migrated system 30 should work on the packet-based portion.

The circuit-based technologies handled by the non-migrated system 40 are typically managed by mainframe computing systems and therefore typically use copybooks for sending and receiving data. On the other hand, packet-based technologies handled by the migrated system 30 are typically managed by distributed computing systems and therefore typically use messaging-based protocols, such as CORBA messages, for sending and receiving data. Thus, the information regarding late-breaking scenarios transmitted between the migrated system 30 and the order control manager 20 is typically in a different format from the information transmitted between the non-migrated system 40 and the order control manager 20. The order control manager has the capability of converting data from one format to the other so that the transfer of ASRs from one provisioning system 30 or 40 to the other can take place.

For example, when the migrated system 30 returns to the order control manager 20 a portion of an ASR that should have been sent to the non-migrated system 40, the migrated system 30 might send the information as a CORBA message. The order control manager 20 would then convert the CORBA message to a copybook and send the copybook to the non-migrated system 40. Similarly, when the non-migrated system 40 returns to the order control manager 20 a portion of an ASR that should have been sent to the migrated system 30, the non-migrated system 40 might send the information as a copybook. The order control manager 20 would then convert the copybook to a CORBA message and send the CORBA message to the migrated system 30.

A single ASR may deal with a large number of circuit-based and/or packet-based communication paths. A CORBA message or a copybook such as those described above is typically sent from the migrated system 30 or the non-migrated system 40 to the order control manager 20 for each communication path that is assigned incorrectly. That is, multiple messages might be sent between a provisioning system 30 or 40 and the order control manager 20 for each ASR rather than a single message for an entire ASR.

An order control database 25 may archive transaction information and may serve as a central data repository for data being processed by the provisioning systems 30 or 40. Upon receiving an ASR from the order entry system 10, the order control manager 20 stores the ASR in the order control database 25. When the order control manager 20 receives late-breaking information, it updates the ASR appropriately in the order control database 25 and sends the updated ASR to one or both of the provisioning systems 30 and/or 40. Similarly, the order entry system 10, the migrated system 30, and the non-migrated system 40 may have associated databases 15, 35, and 45, respectively, to store ASR-related information.

In addition to the order control database 25, the order control manager 20 can contain a queuing mechanism where messages about late-breaking events can be queued and processed one at a time. The order control manager 20 can also receive milestones from the provisioning systems 30 and 40 confirming completion of the steps in the provisioning process. The order control manager 20 can send the milestones to the order entry system 10.

The order control manager 20, the migrated system 30, and the non-migrated system 40 may also be operable for order rejection functionality. For example, when one of the late breaking scenarios described above occurs, either or both of the migrated and non-migrated systems 30 and 40 may reject the order. This may occur, for example, where the details about the order, such as circuit information, address, or other data does not match or conform with information maintained by the migrated and/or non-migrated systems 30 and 40. Ordinarily, the migrated and non-migrated systems 30 and 40 may notify order control manager 20 as part of a routine confirmation process. In the event of, for example, a non-conformity, the migrated and/or non-migrated systems 30 and 40 may reject the order and notify the order control manager 20 accordingly. The order control manager 20, may notify the other of the migrated and non-migrated systems 30 and 40 that the changes was rejected. Additional errors condition may follow thereafter, such as notifying the appropriate person(s) that the order or change has been rejected and perhaps including some basis for the rejection.

In one embodiment, the present disclosure provides a system and method for initial migration and population of orders to the migrated system 30. For example, in cases where the underlying network has yet to be migrated and/or the migrated system 30 has not come online, the orders would likely be directed to the non-migrated system 40. Once portions of the network are subsequently converted and the migrated system 30 begins operating, all orders related to provisioning services, either partially or completely, on the new migrated network and related migrated system 30 would automatically become late breaking scenarios. As such, the migrated system 30 is populated with orders that become late breaking scenarios by the functionality of the present system, including the order control manager 20, as disclosed herein. This may be useful since it eliminates the need to re-entered or otherwise manually moved order data from the non-migrated system 40 to the migrated 30 system. Additionally, the customers need not re-submit the orders or otherwise be troubled by the migration to implement the services requested by the orders.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A method for managing circuit-to-packet provisioning late breaking scenarios, the method comprising:
   receiving an order for services to provision;
   determining a network type associated with a network to provision the services;
   associating the network type with the order;
   allocating at least some of the order to a first system based on the network type associated with the order, the first system operable to managing provisioning the services on the network;
   determining that the network type associated with the network upon which the services are provisioned is different;
   changing the network type;
   reallocating the at least some of the order to a second system based on the change to the network type associated with the order, the second system operable to manage provisioning services on the network;
   wherein the first system is a migrated system operable for managing provisioning of packet-based systems and wherein the second system is a non-migrated system operable for managing provisioning of circuit-based systems; and
   wherein the order was initially associated with packet-based network type and subsequently re-associated with a circuit-based network type.

2. The method of claim 1, wherein the reallocating at least some of the order to the non-migrated system further includes:
   removing the order from the migrated system and adding the order to the non-migrated system.

3. The method of claim 1, wherein the order was initially associated with packet-based network type and subsequently re-associated with both packet-based and circuit-based network types.

4. The method of claim 3, wherein the reallocating at least some of the order to the non-migrated system further includes adding the at least portion of the order to the non-migrated system.

5. The method of claim 4, further comprising:
   allocating the order, by an order control system, to the migrated system; and
   reallocating at least the portion the order, by the order control system, to the non-migrated system.

6. The method of claim 5, further comprising:
   receiving a CORBA message from the order control system allocating the order to the migrated system;
   identifying that at least the portion of the order is for the non-migrated system; and
   converting the CORBA message to a copybook message;
   receiving the copybook message from the order control system allocating at least the portion of the order to the non-migrate system.

7. A method for populating orders to a migrated computer system operable for managing orders for services on a migrated network, comprising:
   providing a non-migrated computer system operable to manage orders for a non-migrated network, the non-migrated computer system maintaining orders to provision services on the non-migrated network;
   migrating at least a portion of the non-migrated network to the migrated network;
   providing a module in communication with the migrated and non-migrated computer systems, the modules operable to identify the orders associated with the migrated network portion that are maintained by the non-migrated computer system;

populating the orders associated with the migrated network to the migrated computer system;

wherein the orders include network identifier portion to associate the order with one of the migrated, non-migrated, or both migrated and non-migrated networks;

analyzing the order maintained by the non-migrated system;

determining the association of the network identifier portion of the orders; and populating the orders where the network identifier portion of the order associates the order with the migrated network.

8. The method of claim 7, wherein the network identifier portion of the order is associated with both the migrated and non-migrated systems.

9. The method of claim 7, wherein the network identifier portion of the order is further defined as data identifying the network whereon the services of the order will be provisioned.

10. The method of claim 7, wherein the network identifier portion of the order is further defined as data related the network whereon the services of the order will be provisioned.

* * * * *